United States Patent
Nishioka

(10) Patent No.: US 8,483,052 B2
(45) Date of Patent: Jul. 9, 2013

(54) COMMUNICATION NETWORK SYSTEM, COMMUNICATION DEVICE, ROUTE DESIGN DEVICE, AND FAILURE RECOVERY METHOD

(75) Inventor: Itaru Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 12/920,240

(22) PCT Filed: Mar. 24, 2009

(86) PCT No.: PCT/JP2009/055804
§ 371 (c)(1), (2), (4) Date: Aug. 30, 2010

(87) PCT Pub. No.: WO2009/119571
PCT Pub. Date: Oct. 1, 2009

(65) Prior Publication Data
US 2011/0044163 A1 Feb. 24, 2011

(30) Foreign Application Priority Data
Mar. 25, 2008 (JP) .................... 2008-079219

(51) Int. Cl.
*G01R 31/08* (2006.01)

(52) U.S. Cl.
USPC .......................................... 370/225; 370/216

(58) Field of Classification Search
USPC .............................. 370/216–225
See application file for complete search history.

(56) References Cited

U.S. PATENT DOCUMENTS

| 6,324,162 | B1* | 11/2001 | Chaudhuri | 370/225 |
|---|---|---|---|---|
| 2002/0004843 | A1* | 1/2002 | Andersson et al. | 709/238 |
| 2002/0131424 | A1 | 9/2002 | Suemura | |
| 2005/0152269 | A1* | 7/2005 | Liu | 370/225 |
| 2006/0256712 | A1 | 11/2006 | Imajuku et al. | |
| 2007/0036544 | A1 | 2/2007 | Fukashiro et al. | |
| 2008/0056294 | A1 | 3/2008 | Maeda et al. | |

FOREIGN PATENT DOCUMENTS

| EP | 1596539 A1 | 11/2005 |
|---|---|---|
| JP | 2002-271372 A | 9/2002 |
| JP | 2003-078554 A | 3/2003 |
| JP | 2003-318983 A | 11/2003 |
| JP | 2007-36412 A | 2/2007 |
| JP | 2007-053793 A | 3/2007 |
| JP | 2008-060755 A | 3/2008 |

* cited by examiner

OTHER PUBLICATIONS

Itaru Nishioka et al., "GMPLS Challenges for Future Optical Networks", Optical Internet, COIN 2008, 7th International Conference on IEEE, Oct. 14, 2008, pp. 1-2.

J. Lang et al., "RSVP-TE Extensions in Support of End-to-End Generalized Multi-Protocol Label Switching (GMPLS) Recovery", IETF RFC4872, Chapters 5-11, May 2007.

*Primary Examiner* — Yemane Mesfin
*Assistant Examiner* — Wanda Z Russell
(74) *Attorney, Agent, or Firm* — Sughrue Mion, PLLC

(57) ABSTRACT

A communication network system including a plurality of communication devices each including a switching unit which switches traffic routes, and transmission links which connects the plurality of communication devices, wherein a start-point communication device of the plurality of communication devices including: a storage unit which previously stores information of a plurality of detour paths corresponding to but having routes different from a working path that is transferring traffic between the start-point communication device and an endpoint communication device; and a setting unit which receives a failure notification when a failure occurs in the working path, selects a detour path that is switchable and has the highest priority from among the plurality of detour paths stored in the detour path information storage unit, and then sets relevant communication devices among the plurality of communication devices along the route of the detour path to recover from the failure.

9 Claims, 12 Drawing Sheets

T400

| PRIORITY | ROUTE INFORMATION | ADJUSTMENT LINK | COST | OVERLAPPING DEGREE | STATE |
|---|---|---|---|---|---|
| 0 | AC→<u>CB</u> | | 20 | 0 | Down |
| 1 | AC→CE→EB | | 30 (20) | 1 | Up |
| 2 | AD→DE→EB | | 30 | 0 | Up |
| 2 | AD→DF→FB | | 30 | 0 | Up |
| 2 | AC→CE→EG→GB | | 40 (30) | 1 | Up |
| 2 | AD→DE→EC→<u>CB</u> | | 40 (30) | 1 | Down |
| 3 | AD→DF→FG→GB | | 40 | 0 | Up |
| 3 | AD→DE→EG→GB | | 40 | 0 | Up |
| 3 | AC→CE→ED→DF→FB | | 50 (40) | 1 | Up |
| 4 | AC→CE→ED→DF→FG→GB | | 60 (50) | 1 | Up |

| PRIORITY | ROUTE INFORMATION | ADJUSTMENT LINK | COST | OVERLAPPING DEGREE | STATE |
|---|---|---|---|---|---|
| 0 | AC→CB | | 20 | 0 | Down |
| 1 | AC→CE→EB | | 30 (20) | 1 | Down |
| 2 | AD→DE→EB | | 30 | 0 | Down |
| | AD→DF→FB | | 30 | 0 | Down |
| 2 | AC→CE→EG→GB | | 40 (30) | 1 | Down |
| | AD→DE→EC→CB | | 40 (30) | 1 | Down |
| 3 | AD→DF→FG→GB | | 40 | 0 | Down |
| | AD→DE→EG→GB | | 40 | 0 | Down |
| 3 | AC→CE→ED→DF→FB | | 50 (40) | 1 | Down |
| 4 | AC→CE→ED→DF→FG→GB | | 60 (50) | 1 | Up |

| PRIORITY | ROUTE INFORMATION | ADJUSTMENT LINK | COST | OVERLAPPING DEGREE | STATE |
|---|---|---|---|---|---|
| 0 | AC→CB | | 20 | 0 | Down |
| 1 | AC→CE→EB | | 30 (20) | 1 | Up |
| 2 | AD→DE→EB | | 30 | 0 | Up |
| 2 | AD→DF→FB | | 30 | 0 | Down |
| 2 | AC→CE→EG→GB | | 40 (30) | 1 | Up |
| 2 | AD→DE→EC→CB | | 40 (30) | 1 | Down |
| 3 | AD→DF→FG→GB | DF, FB | 40 | 0 | Up |
| 3 | AD→DE→EG→GB | | 40 | 0 | Up |
| 3 | AC→CE→ED→DF→FB | | 50 (40) | 1 | Down |
| 4 | AC→CE→ED→DF→FG→GB | DF, FB | 60 (50) | 1 | Up |

| PRIORITY | ROUTE INFORMATION | ADJUSTMENT LINK | COST | OVERLAPPING DEGREE | STATE |
|---|---|---|---|---|---|
| 0 | DF→FB | | 20 | 0 | Down |
| 0 | DE→EB | CB, AC | 20 | 0 | Up |
| 1 | DF→FG→GB | | 30 (20) | 1 | Up |
| 2 | DE→EG→GB | | 30 | 0 | Up |
| 2 | DE→EC→CB | | 30 | 0 | Down |
| 2 | DA→AC→CB | | 30 | 0 | Down |
| 2 | DF→FG→GE→EB | CB, AC | 40 (30) | 1 | Up |
| 2 | DE→EG→GF→FB | | 40 (30) | 1 | Down |
| 3 | DA→AC→CE→EB | CB, AC | 40 | 0 | Up |
| 3 | DF→FG→GE→EC→CB | | 50 (40) | 1 | Down |

COMMUNICATION NETWORK SYSTEM, COMMUNICATION DEVICE, ROUTE DESIGN DEVICE, AND FAILURE RECOVERY METHOD

TECHNICAL FIELD

The present invention relates to a communication network system which switches a path to a detour path when a failure occurs, a communication device of the communication network system, a route design device, and a failure recovery method for when a failure occurs. In particular, the present invention relates to a communication network system capable of rapid detouring using minimal network resources in consideration of a plurality of failure locations when a plurality of failures occur simultaneously within a predetermined period of time in the communication network system, and capable of reversion to an original state after recovery from the failure, a communication device, a route design device, and a failure recovery method.

This application claims priority to and the benefit of Japanese Patent Applications No. 2008-079219 filed on Mar. 25, 2008, the disclosure of which is incorporated herein by reference.

BACKGROUND ART

An example of a conventional failure recovery scheme in a communication network is disclosed in Non-Patent Document 1 and Patent Document 1. This conventional failure recovery scheme in the communication network includes 1+1 protection (1+1 Unidirectional/Bidirectional Protection), 1:1 Protection, reservation type restoration (Shared Mesh Restoration), and path re-routing (LSP Re-routing), as disclosed in Non-Patent Document 1.

All of these failure recovery methods except for the path re-routing include previously determining preliminary routes for a currently-used route. For this reason, detouring the failure fails when multiple failures occur simultaneously on the currently used route and the preliminary route. As a result, in cases of multiple failures, the path re-routing as disclosed in Patent Document 1 has been applied.

Patent Document 1 discloses that when protection fails, path re-routing is performed under control of a GMPLS control unit. In such related art, a communication device includes a routing protocol unit, a topology DB for recording failures or empty bands of links reported by the routing protocol unit, and a signaling protocol unit for controlling paths.

Patent Document 1 also discloses the topology DB as a forwarding DB and the signaling protocol as a GMPLS control unit. Conventional path re-routing when the communication device having the above-described configuration is used is performed as follows.

After receiving a failure notification, the communication device deletes a currently-used path. The communication device then refers to the topology DB collected by the routing protocol to calculate a detour path that does not include failure locations. The communication device sets a new path along the detour route using a signaling protocol to recover from the communication failure.

However, such path re-routing has the following problems.

The first problem is that since it takes time for the routing protocol to notify the communication device of the failure location after the failure occurs, it is necessary to wait for a predetermined period of time in order to calculate the detour route and it takes time to recover from the failure.

Further, since it is impossible to detect whether the routing protocol was converged, it is not known whether a failure has occurred on the detour route calculated by referring to the topology DB of a start-point communication device. Therefore, when multiple failures occur, there is a possibility that a route including a failure location that is not present on the currently-used path is calculated, thus decreasing reliability of the calculated route.

The second problem is that, because a re-routing operation is dispersively performed, network resource contention may occur at intermediate communication nodes when a plurality of currently-used paths simultaneously fail. For example, referring to the network shown in FIG. 14, a link between communication devices B and C and a link between communication devices B and F have simultaneously failed. A communication device 1000 is disposed at a location encircled with a symbol A in FIG. 14. Similarly, communication devices 1000 are also disposed at locations encircled with symbols B, C, D, E, F, and G.

In FIG. 14, a transmission link between the communication device A and the communication device C is indicated by a transmission link 90-AC.

Here, a detour route for a currently-used path 1100 is calculated by the communication device A and a detour route for a currently-used path 1200 is calculated by the communication device D. In the detour route calculation, the communication device A or D does not consider the detour route of the communication device D or A. Accordingly, even when a link between the communication devices D and E or a link between the communication device E and B is an insufficient-band link having a band for only one detour path, a contention route is calculated through a shortest route calculation. Accordingly, one of the communication devices fails to set the detour path. In FIG. 14, the communication device A sets a detour route 1101 and the communication device D sets a detour route 1201. Accordingly, for example, a link between the communication device B and the communication device E becomes a contention link.

The third problem is that the currently-used path cannot be reverted to the original route after recovery from the failure. This is because the currently-used path needs to be deleted to set the detour route in order to reuse network resources other than those in a failure section that is being used by a failed currently-used path.

In general, the currently-used path is set as an optimal path in a range allowing the network to normally operate. For this reason, failure to revert to an original route of the currently-used path after recovery from all failures means that the optimal working state cannot be restored.

Non-Patent Document 1: J. Lang, Y. Rekhter, D. Papadimitriou, "RSVP-TE Extensions in Support of End-to-End Generalized Multi-Protocol Label Switching (GMPLS) Recovery," IETF RFC4872. Chapters 5 to 11.

Patent Document 1: Japanese Patent Application No. 2002-125711 (Japanese Unexamined Patent Publication, First Publication No. 2003-318983)

DISCLOSURE OF INVENTION

Problem to be Solved by the Invention

The present invention has been achieved in view of the above circumstances, and it is a first object of the present invention to provide a communication network system, a communication device, a route design device, and a failure recovery method which is irrespective of convergence time of a routing protocol and is capable of quickly detouring a plurality of paths without resource contention for setting detour routes even in the case of multiple failures.

A second object of the present invention is to provide a communication network system, a communication device, a route design device, and a failure recovery method capable of reverting to an originally used route after recovery from failure.

Means for Solving the Problem (1) The present invention has been made to solve the above-described problems. According to an aspect of the present invention, there is provided a communication network system comprising a plurality of communication devices each comprising a switching unit which switches traffic routes, and transmission links which connects the plurality of communication devices, wherein a start-point communication device of the plurality of communication devices comprising: a storage unit which previously stores information of a plurality of detour paths corresponding to but having routes different from a working path that is transferring traffic between the start-point communication device and an endpoint communication device; and a setting unit which receives a failure notification when a failure occurs in the working path, selects a detour path that is switchable and has the highest priority from among the plurality of detour paths stored in the detour path information storage unit, and then sets relevant communication devices among the plurality of communication devices along the route of the detour path to recover from the failure.

(2) In the communication network system according to the aspect of the present invention, the plurality of detour paths stored in the storage unit of the start-point communication device are registered as paths for which reserving of bands and setting of the switching units are not performed in the communication devices along the route of the detour path, and when a failure affecting the detour path occurs, the communication device that has detected the failure or the communication device that has received the failure notification notifies the start-point communication device of a failure location.

(3) In the communication network system according to the aspect of the present invention, a requested band of the path is 0 in signaling for setting the detour path.

(4) In the communication network system according to the aspect of the present invention, the storage unit of the start-point communication device comprises a working path database which stores the working paths and a detour path database which stores information of the detour paths, and the setting unit of the start-point communication device: stores information of the currently-used path that has been used as the working path in the detour path database as a detour path during the failure, stores information of the detour path used as the working path in the working path database, and refers to the information of the detour path to perform signaling for setting the detour path as a working path when switching to the detour path, and also stores the information of the currently-used path from the detour path database in the working path database after recovery from the failure, and refers to the information of the relevant currently-used path to revert to the currently-used path.

(5) In the communication network system according to the aspect of the present invention, the communication network system further comprises a route design device which calculates routes of detour paths that do not contend with each other when a failure occurs in calculation of the detour paths corresponding to different currently-used paths, wherein the route design device calculates routes of the detour paths that are previously set in the start-point communication device.

(6) According to another aspect of the present invention, there is provided a communication device in a communication network system comprising a plurality of communication devices each comprising a plurality of transmission interfaces which converts main signals so as to have a predetermined transfer format for transmission and reception, multiplexing/demultiplexing units which multiplexes the main signals transmitted from the relevant transmission interfaces or demultiplexing received signals, and a switching unit which switches routes for the main signals; and transmission links which connects the plurality of communication devices, the communication device comprising: a detour path selecting unit which selects a detour path that is switchable and has the highest priority from among a plurality of detour path candidates when a failure occurs in a working path that is transferring traffic; and a signaling unit which sets the communication devices along a route of the detour path selected by the detour path selecting unit.

(7) In the communication device according to the aspect of the present invention, the communication device further comprises: a path management unit which manages the routes of the working path and the detour path; and a failure notification party management unit which determines a party to be notified when a failure in the detour path or the working path is detected.

(8) According to further another aspect of the present invention, there is provided a route design device in a communication network system having a plurality of communication devices each comprising a switching unit which switches traffic routes, and transmission links which connects the plurality of communication devices, the route design device comprising: a route calculation unit which refers to topology information of the communication network to calculate a route from a start-point communication device to an endpoint communication device; and a detour path adjusting unit which adjusts detour paths to prevent contention from occurring between the detour paths when the detour paths are calculated.

(9) According to further another aspect of the present invention, there is provided a failure recovery method in a communication network system comprising a plurality of communication devices each comprising a switching unit which switches traffic routes, and transmission links which connects the plurality of communication devices, wherein a start-point communication device of the plurality of communication devices: sets a plurality of detour paths corresponding to but having routes different from a working path that is transferring traffic between the start-point communication device and an endpoint communication device, and selects a detour path that is switchable and has the highest priority from among the plurality of detour paths when a failure occurs in the working path and then sets communication devices along a route of the detour path to recover from the failure.

(10) In the failure recovery method according to the aspect of the present invention, when switching to the detour path, the start-point communication device stores information of a currently-used path that has been used as the working path as a detour path during the failure, and reverts to the currently-used path after recovery from the failure.

Effect of the Invention

According to the present invention as described above, paths that do not reserve bands on detour route candidates are made to be set and then reported to a communication device that performs switching in consideration of affective failures only. Accordingly, when not only a single failure, but also multiple failures occur, failure locations can be rapidly determined without using a routing protocol to set detour paths.

In addition, according to the present invention, a plurality of detour paths can be designed by a detour route adjusting function. Therefore, when a plurality of failures occur, all detour routes can be set without causing network resource contention between the plurality of detour paths.

Further, according to the present invention, reversion after recovery from the failure is possible by managing currently-used paths and detour paths separately from each other and storing the paths used when the failure occurs in a detour path DB. Therefore, reversion to the original route after recovery from the failure is possible.

BRIEF DESCRIPTION OF THE DRAWINGS

FIG. 13A shows path information T430 in a working path DB 131 and a detour path DB 132 when a failure occurs in a communication device A.

FIG. 13B shows path information T440 in a working path DB 131 and a detour path DB 132 when a failure occurs in a communication device D.

REFERENCE SYMBOLS

Figure 1:
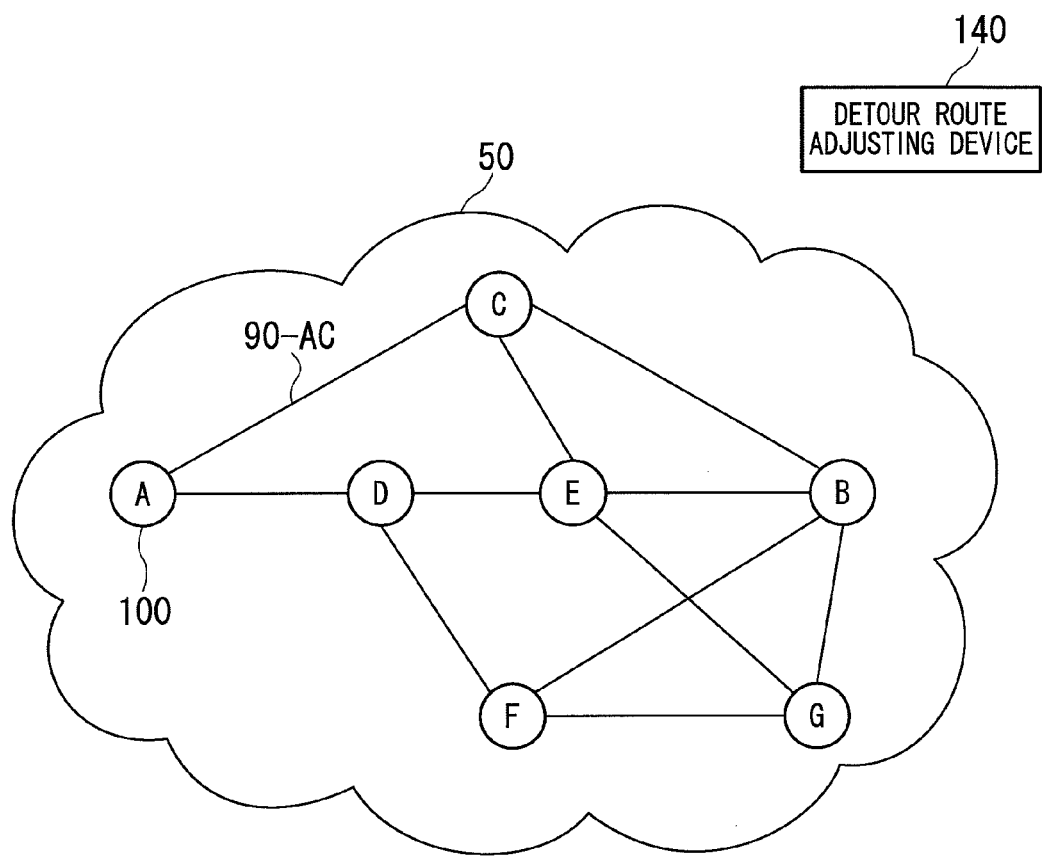
FIG. 1 is a block diagram showing a network configuration according to a first embodiment of the present invention.

50: network
90: transmission link
100: communication device
110: communication device hardware unit
111: switch unit
112a to 112h: transmission I/F unit
113a, 113b: client I/F unit
114a to 114d: multiplexing and demultiplexing unit
120: communication device software unit
121: path management unit
122: failure notification party management unit
123: XC control monitoring unit
124: detour path selection procedure
125: failure link analysis unit
126: signaling unit
127: control I/F unit
128: out-band control line
129: in-band control line
131: working path DB
132: detour path DB
133: notification party DB
140: detour route adjusting device
141: route calculation unit
142: detour route adjusting unit
143: request receiving unit
145: currently-used path information
146: all detour path information
147: topology information
10, 50: working path
20, 30, 40, 60: detour path
T400 to T440: table information

BEST MODE FOR CARRYING OUT THE INVENTION

Embodiments of the present invention will now be described with reference to accompanying drawings.

Figure 2:
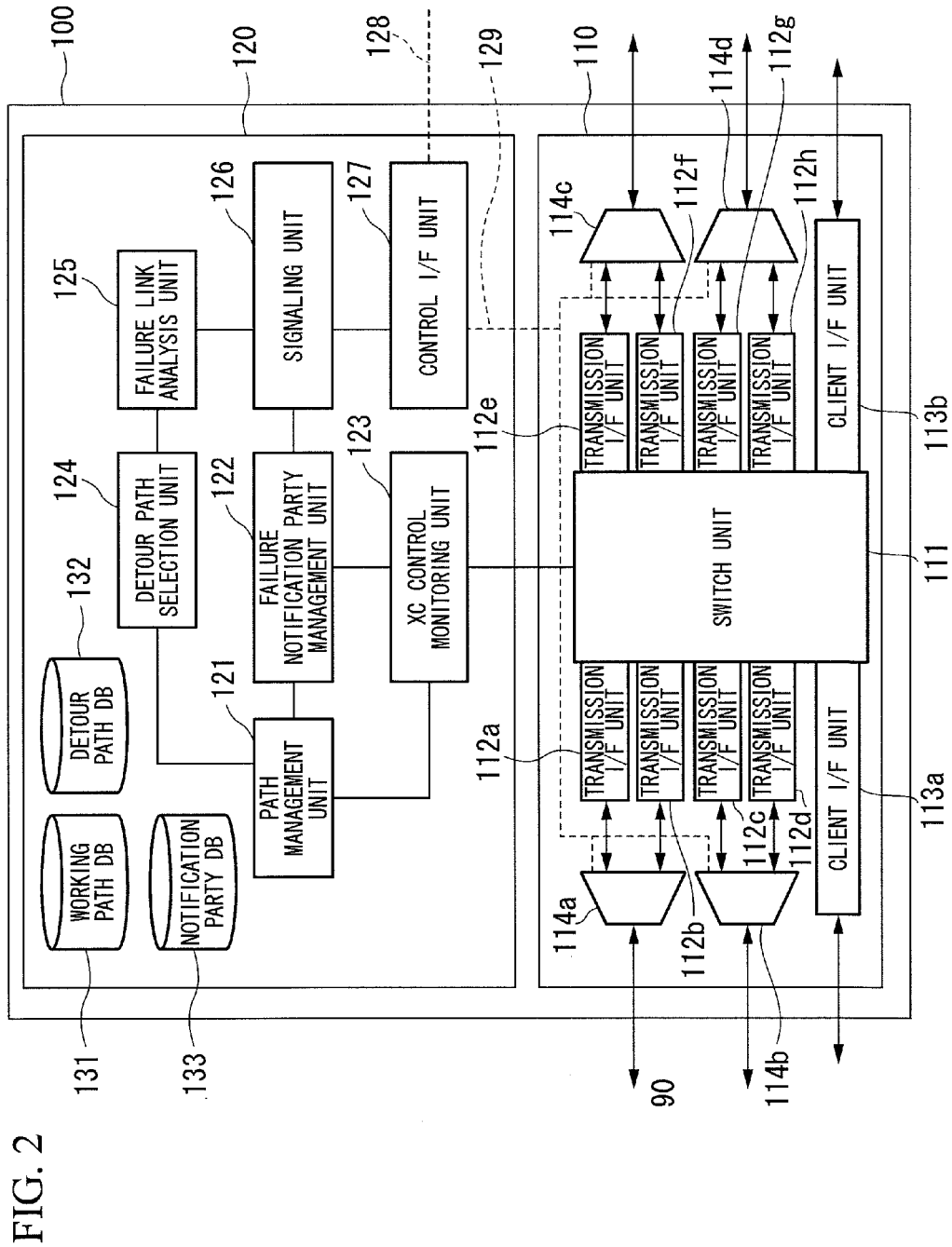
FIG. 2 is a block diagram showing a configuration of a communication device according to the first embodiment of the present invention.
Figure 3:
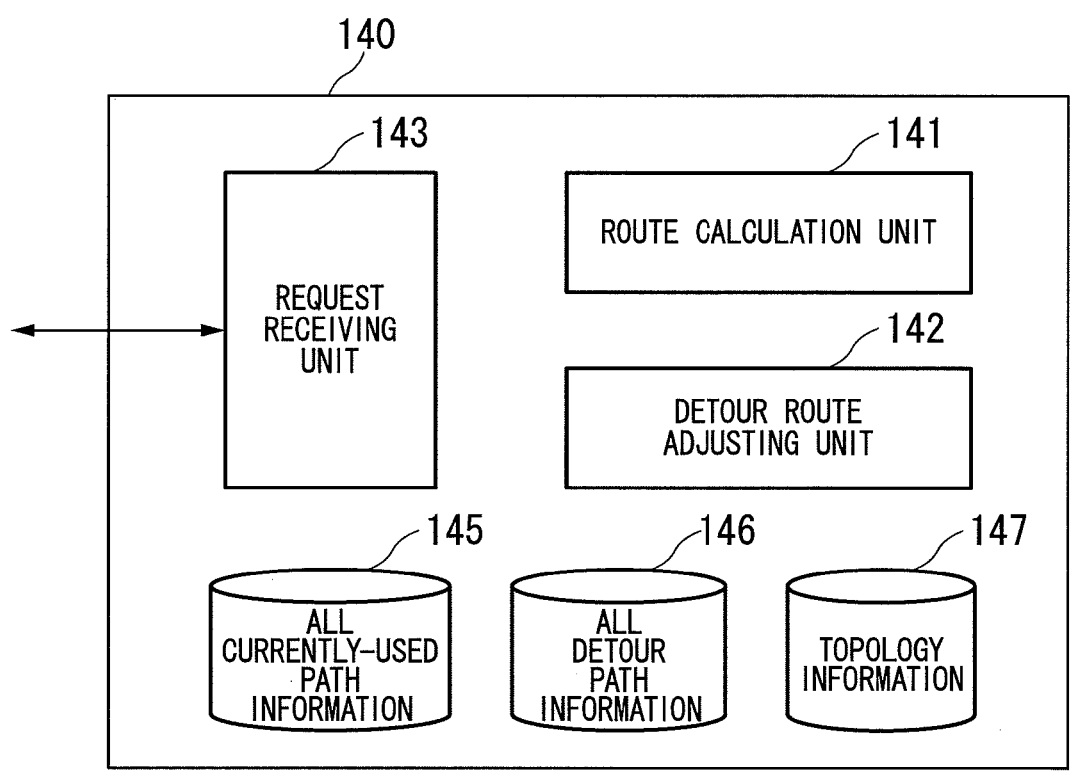
FIG. 3 is a block diagram showing a configuration of a detour route adjusting device according to the first embodiment of the present invention.

FIG. 1 is a block diagram showing a network configuration according to a first embodiment of the present invention. FIG. 2 is a block diagram showing a configuration of a communication device 100 according to the first embodiment of the present invention. FIG. 3 is a block diagram showing a configuration of a detour route adjusting device 140 (route design device) according to the first embodiment of the present invention.

A network 50 in FIG. 1 includes communication devices 100-$i$ (where i denotes identifiers of the communication devices), and transmission links 90-$ij$ (where i and j denote identifiers of the communication devices at both ends of the transmission link) which connects the communication devices.

In FIG. 1, each of i and j may be any one of A, B, C, D, E, F, and G. The communication device 100-A is shown as the encircled A in FIG. 1. The other communication devices 100-B to 100-G are also shown in the same manner.

The detour route adjusting device 140 is disposed to adjust the detour routes on the network 50.

The communication device 100-A of FIG. 1 has the configuration of the communication device 100 shown in FIG. 2. Similarly, the other communication devices 100-B to 100-G have the configuration of the communication device 100 shown in FIG. 2.

The communication device 100 shown in FIG. 2 includes a communication device control hardware unit 110 and a communication device control software unit 120. The communication device control software unit 120 operates on a control infrastructure having a processor and volatile/nonvolatile memories. Here, the configuration of the control infrastructure is not separately shown.

The communication device control hardware unit 110 includes a switch unit 111, transmission interface (I/F) units 112a to 112h (also referred to as transmission I/F units), client interface units 113a and 113b (also referred to as client I/F units), and multiplexing and demultiplexing units 114a to 114d.

The switch unit 111 switches main signal routes. The transmission I/F units 112a to 112h convert the main signals switched by the switch unit 111 so as to have a predetermined transfer format for transmission and reception to and from other communication devices.

The client I/F units 113a and 113b are connected to respective client devices and convert signals so as to have a predetermined transfer format for signal transmission and reception. The multiplexing and demultiplexing units 114a to 114d perform multiplexing or demultiplexing on the main signals output from the transmission I/F units 112a to 112h.

For example, different optical wavelengths, optical transport network (OTN), optical network/synchronous digital hierarchy (SONET/SDH), Ethernet (registered trademark), asynchronous transfer mode (ATM), frame relay (FR) and so on are used as the transfer formats of the transmission I/F units 112a to 112h and the client I/F units 113a and 113b.

The communication device 100 has an in-band control line 129 which exchanges control signals with adjacent communication devices using some channels of the transmission link.

The communication device software unit 120 includes a path management unit 121, a failure notification party management unit 122, an XC control monitoring unit 123, a detour path selecting unit 124, a failure link analysis unit 125, a signaling unit 126, and a control interface unit (also referred to as a control I/F unit) 127.

The communication device software unit 120 stores a working path DB 131, a detour path DB 132, and a notification party DB 133.

The path management unit 121 is also referred to as a setting unit. In addition, the working path DB 131, the detour path DB 132, and the notification party DB 133 are referred to as storage units.

The signaling unit 126 executes a signaling protocol which sets a path between the communication devices or notifying the communication device of the failure of the path. The control I/F unit 127 converts the signaling protocol into control information.

Here, an example of the signaling protocol may include RSVP-TE or CR-LDP.

The control I/F unit 127 transmits and receives control information using any one or both of an out-band control line 128 separate from the transmission link 90 via which the main signals are transmitted and the in-band control line 129 multiplexed to the same transmission link for the main signals.

The path management unit 121 manages the working paths and the detour paths which are set. The XC control monitoring unit 123 controls the switch unit 111, the transmission I/F units 112a to 112h, and the client I/F units 113a and 113b, and detects the failure of the units.

The failure notification party management unit 122 manages parties to be notified of a failure detected by the XC control monitoring unit 123 when the failure affects the working path or the detour path. The failure link analysis unit 125 analyzes the path failure.

Among all communication devices on the working path/ detour path, a notification party (start-point communication device) to be notified of a failure when the failure occurs is stored in the notification party database (also referred to as a notification party DB) 133. In addition, in a communication device switching the path, the working path and the detour path are stored in the working path database (also referred to as a working path DB) 131 and the detour path database (also referred to as a detour path DB) 132, respectively.

Next, a configuration of the detour route adjusting device 140 (FIG. 1) will be described with reference to FIG. 3. The detour route adjusting device 140 has a route calculation unit 141, a detour route adjusting unit 142, and a request receiving unit 143. The detour route adjusting device 140 stores all currently-used path information 145, all detour path information 146 and topology information 147.

The request receiving unit 143 receives a request to design routes of the working path and the detour path. The route calculation unit 141 calculates a route of a requested section. The detour route adjusting unit 142 adjusts the calculated routes of the detour paths between the currently-used paths.

The topology information 147 is information necessary for the route calculation unit 141 to calculate the route. In addition, the currently-used path information 145 is information regarding all currently-used paths which have been previously set in the network. In addition, the detour path information 146 is information regarding all detour paths.

Such information is managed in the detour route adjusting device 140, or is acquired by receiving the information stored in an external server such as a network management system (NMS).

Next, all operations of the communication network system according to an embodiment of the present invention will be described with reference to the configuration of the communication device 100 of FIG. 2 and flowcharts of FIGS. 4 and 5.

Paths set in the embodiment of the present invention include working paths and detour paths. A working path is one that actually reserves network resources. A detour path is one that does not reserve network resources and is set for reporting a failure.

In a state with no failure, the currently-used path is used as the working path. When a failure occurs in the working path, a path candidate that can be used for path re-routing is treated as the detour path in the communication device at a switching end point.

In addition, the currently-used path employed in the present embodiment is a path that is initially set as the working path in a state with no failure.

Figure 4:
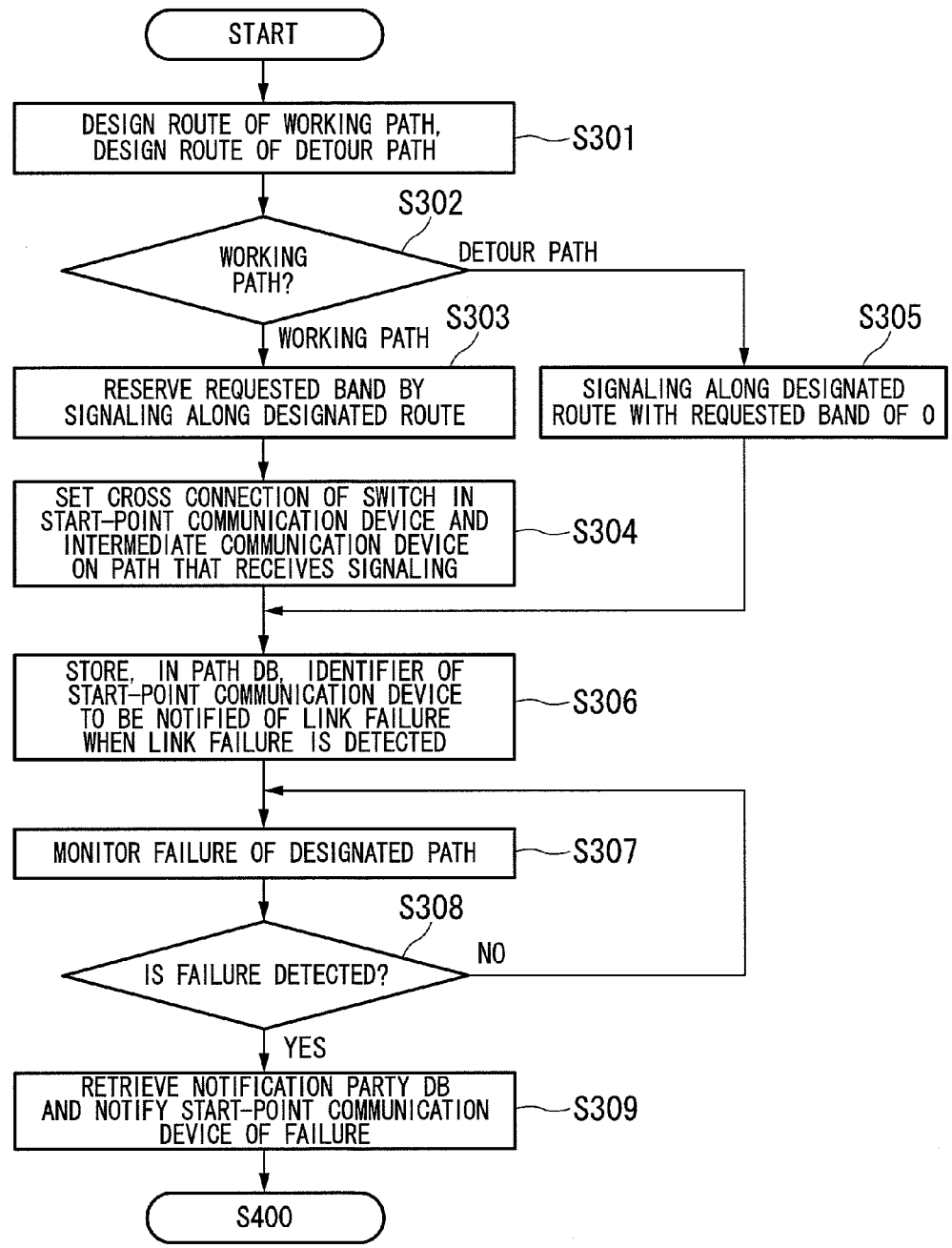
FIG. 4 is a flowchart showing a path setting procedure according to the first embodiment of the present invention.

FIG. 4 is a flowchart showing a procedure of setting the working path and the detour path.

The detour route adjusting device 140 calculates a route of the working path that actually flows traffic between the startpoint communication device and the endpoint communication device on the path, and a route of the detour path when a failure occurs in the working path, in response to a request to set the path between the start-point communication device and the endpoint communication device, for example, by traffic demand information or a request to start communication service (step S301).

Here, the detour route adjusting device 140 is used to optimize the detour path. Further, functions of the detour route adjusting device 140 may not be set when an administrator can set the functions in consideration of the route in a relatively small communication network.

Next, the start-point communication device that has received the request to set the path determines working/detour attributes of the path (step S302). When the path is the working path, the detour route adjusting device 140 stores the route information of the working path in the working path DB 131. Thereafter, the signaling unit 126 exchanges a signaling message along the calculated route.

When the signaling unit 126 of each communication device receives the signaling message in the process of exchanging the signaling message, the path management unit 121 allocates a network resource called a label while referring to the requested path band information and link vacancy information. Accordingly, the requested band is reserved by signaling along the designated route (step S303).

Further, the path management unit 121 sets cross-connection of the switch unit 111 via the XC control monitoring unit 123 based on the assigned label information (step S304).

While the cross-connection is set, the failure notification party management unit 122 stores, in the notification party DB 133, information of the start-point communication device (the identifier of the start-point communication device) notified of a path failure when the failure is detected (step S306).

When it is determined in step S302 that the path is the detour path, the start-point communication device stores the route information in the detour path DB 132. The signaling unit 126 then exchanges the signaling message indicating that the requested band is 0 along the calculated route. Accordingly, signaling is performed along the designated route with the requested band of 0 (step S305).

When the signaling unit 126 of the communication device located midway on the route receives the signaling message, the signaling unit stores, in the notification party DB 133, the information of the start-point communication device (the identifier of the start-point communication device) notified of the path failure when the failure is detected (step S306).

Here, the signaling message indicating that the requested band is 0 is issued in order to indicate that the path is the detour path and to specify that reserving of the resources in each communication device which has received the signaling message and setting of the cross-connection are not performed.

In the present embodiment, it is specified that reserving of the resources and setting of the cross-connection are not performed by setting the band to 0; however, the present invention is not limited thereto. For example, a flag may be used at a specific location of the signaling message, instead of setting the band to 0.

The path has been set through the process up to step S306. Monitoring of the path failure is then initiated (step S307). It is determined whether the failure was detected in the path that is being monitored (step S308).

When the failure is detected in monitoring the path, the start-point communication device on the failed path is retrieved from the notification party DB 133, and information on the failed path and the failure location are transmitted via the signaling unit 126 (step S309).

Next, detouring for when failures on the working path and the detour path set in the above-described manner are received will be described with reference to FIG. 5. When the start-point communication device on the path receives a path failure from the communication device for which the working path or the detour path is set (step S401), the start-point communication device determines whether the failure is present in the working path (step S402).

Figure 5:
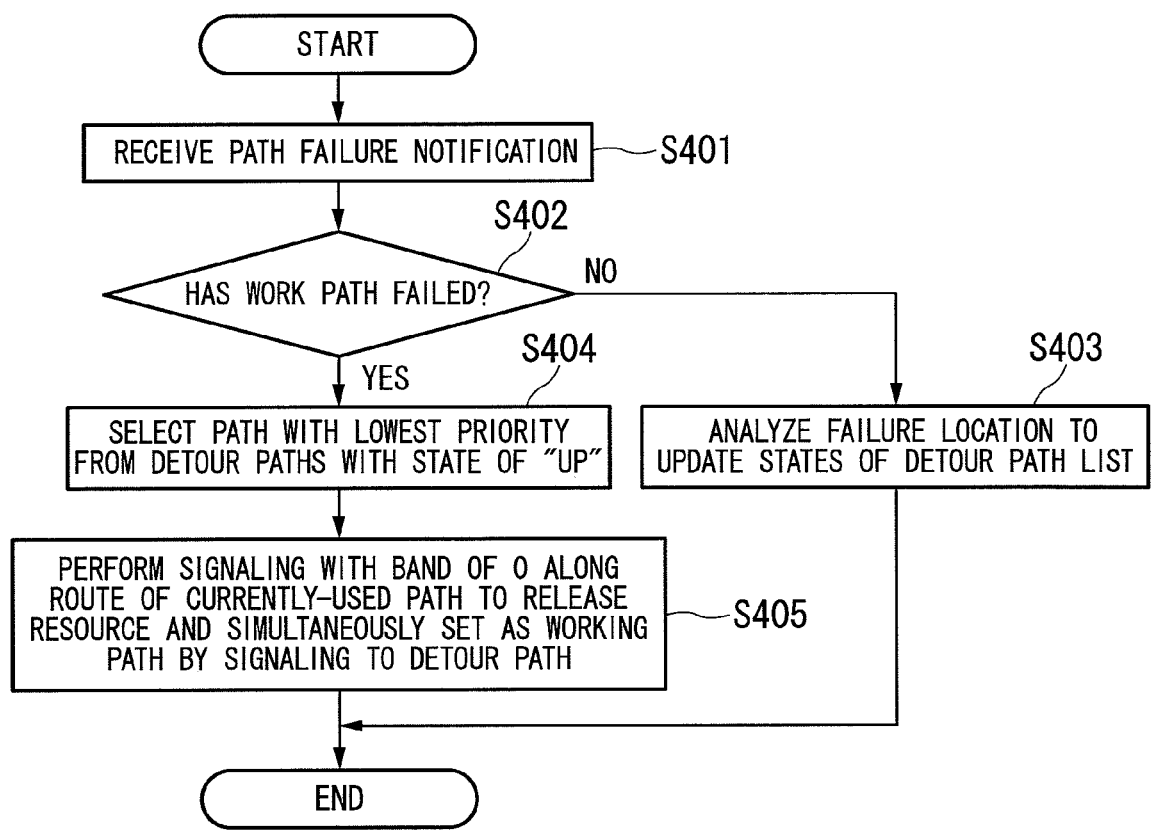
FIG. 5 is a flowchart showing a failure detouring procedure according to the first embodiment of the present invention.

When the failure notification is about the detour path, the location where the failure has occurred is analyzed to update the state of the detour path from Up to Down (step S403), and the process of the flowchart shown in FIG. 5 is terminated.

On the other hand, when it is determined in step S402 that the failure notification is about the working path, the detour path having the lowest priority is selected from among the detour paths having the state of Up (step S404). Signaling is performed with the band of 0 along the route of the working path to release the resource, and then signaling is performed along the route of the detour path to reserve the band and to perform cross-connection so that the working path is set (step S405).

In step S404, when failure occurs simultaneously in a plurality of locations, it is likely that the state of the detour path has not been updated. For this reason, a latency of about several tens of milliseconds may be set until the selection of the detour path is initiated for securely updating the state.

In step S405, information of the failed currently-used path is output from the working path DB 131 to the detour path DB 132, and the set detour path is output from the detour path DB 132 to the working path DB 131.

When the detour path is set using the network resources in which the failed detour path is set, the network resource (label) reserved by the currently-used path is allocated to the detour path when detour path signaling is performed.

Figure 6:
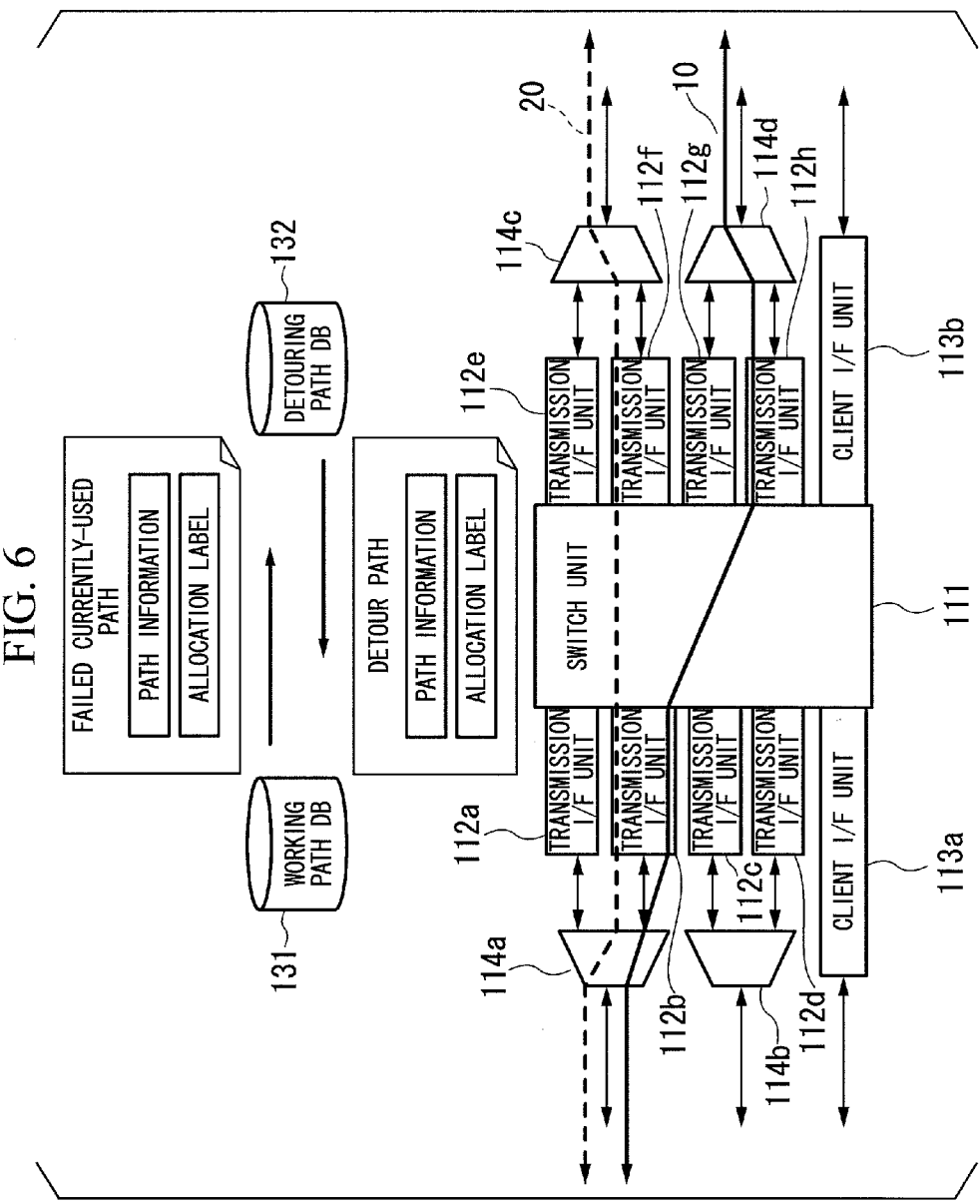
FIG. 6 is a block diagram showing information replacement between a currently-used path and a detour path according to the first embodiment of the present invention.

At this time, as shown in FIG. 6, the information of the currently-used path is output to the detour path DB 132, and the information of the detour path selected from the detour path DB 132 is output to the working path DB 131. Because the information of the currently-used path is stored in the detour path DB 132, it becomes possible to revert to the original route of the currently-used path after recovering from the failure.

A lower part of FIG. 6 shows the case where a path is switched to a working path 10 via the multiplexing and demultiplexing unit 114*a*, the transmission I/F unit 112*b*, the switch unit 111, the transmission I/F unit 112*h*, and the multiplexing and demultiplexing unit 114*d* to the detour path 20 via the multiplexing and demultiplexing unit 114*a*, the transmission I/F unit 112*b*, the switch unit 111, the transmission I/F unit 112*f*, and the multiplexing and demultiplexing unit 114*c*.

Next, an operation of the detour route adjusting device (also referred to as a route design device) 140 that adjusts the detour route between a plurality of currently-used paths will be described with reference to FIGS. 3 and 7. Here, the currently-used path of the path requested to perform a new route design is referred to as a new currently-used path. In addition, the detour path of the path requested to perform a new route design is referred to as a new detour path.

In addition, the currently-used path that is previously set is referred to as a preset currently-used path. The detour path that is previously set is referred to as a preset detour path.

In the detour route adjusting device 140, the route calculation unit 141 calculates routes of the new detour path and the new currently-used path based on a path calculation request indicating a start-point communication device and an endpoint communication device and containing band information (step S501).

Next, when the preset detour path and the new detour path are selected as the working paths due to the failure, it is determined whether contention due to the insufficient bands occurs in the link used in these detour paths (step S502).

When a contention link is present on the new detour path, a detour path that can preferentially use the contention link is determined from among the new detour path and the preset detour path. When the new detour path acquires the right to priority use, the route of the new currently-used path is responded to with the adjusted link to the preset detour path using the contention link.

When the preset detour path acquires the right to priority use, a link in which the preset currently-used path currently used by the preset detour path that has acquired the right to priority use is set, is responded to with the adjusted link of the new detour path.

Figure 7:
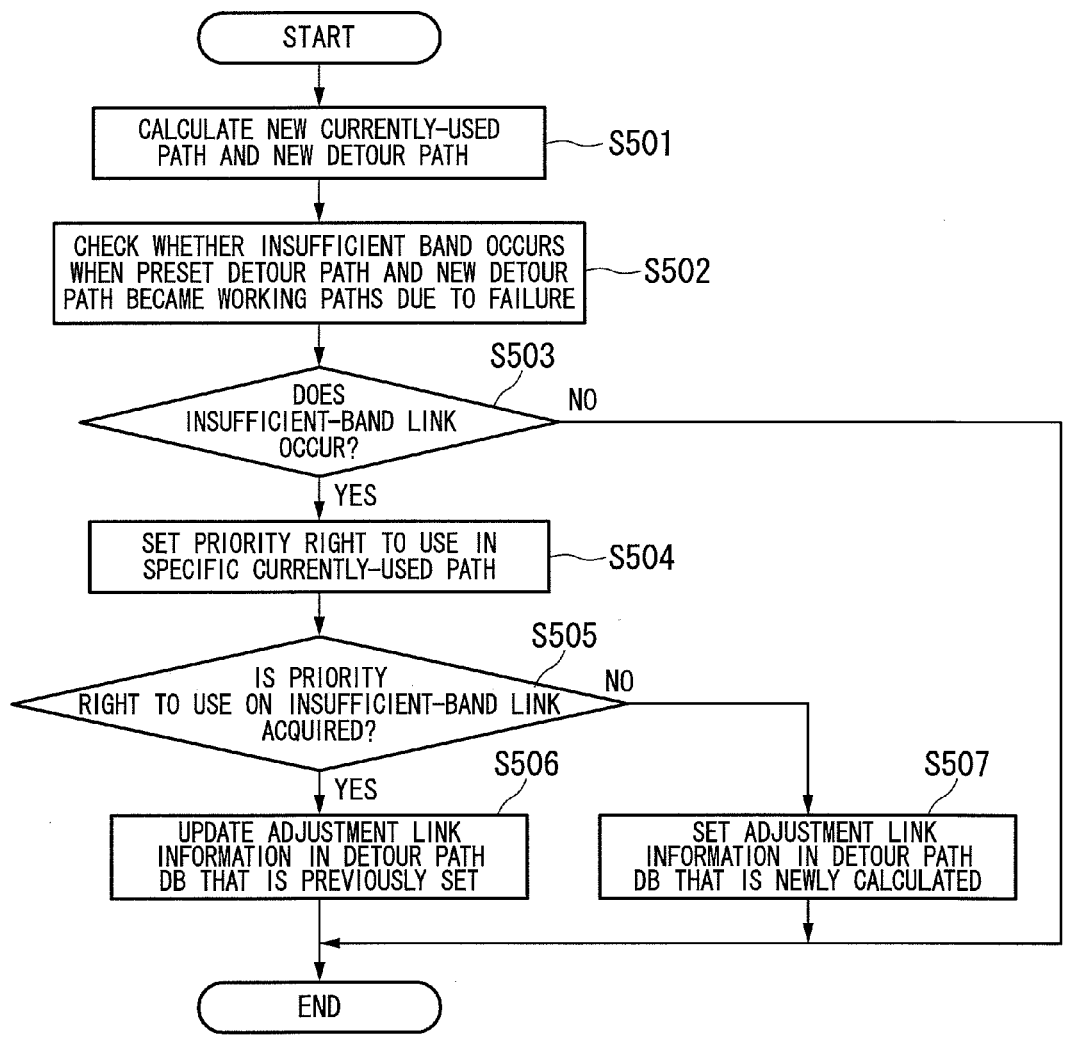
FIG. 7 is a flowchart showing a detour route adjusting procedure according to the first embodiment of the present invention.

According to the flowchart of FIG. 7, the detour route adjusting device 140 performs the following process. That is, the detour route adjusting device 140 determines whether an insufficient-band link has occurred (step S503).

When it is determined in step S503 that an insufficient-band link has occurred, the detour route adjusting device 140 sets the right to priority use in the specific currently-used path (step S504), and performs a process in step S505.

On the other hand, when it is determined in step S503 that an insufficient-band link has not occurred, the detour route adjusting device 140 terminates the process of the flowchart shown in FIG. 7.

In step S505, the detour route adjusting device 140 determines whether the right to priority use was acquired on the insufficient-band link (step S505).

When it is determined in step S505 that the right to priority use was acquired, the adjustment link information of the detour path DB that is previously set is updated (step S506), and the process of the flowchart shown in FIG. 7 is terminated.

On the other hand, when it is determined in step S505 that the right to priority use was not acquired, the adjustment link information of the detour path DB that was newly calculated is set (step S507), and the process of the flowchart shown in FIG. 7 is terminated.

Thus, in the present embodiment, the detour route adjusting device 140 checks and adjusts the contention link when the detour path is detoured. Accordingly, even when multiple failures occur, it is possible to acquire the route that recovers from failures of all the currently-used paths without contention between the detour paths.

A specific example of the above-described detouring operation will be described with reference to FIGS. 8 to 11. In addition, cases of a single failure, multiple failures, and multiple failures that require preventing contention with other paths will be described.

Figures 8, 9:
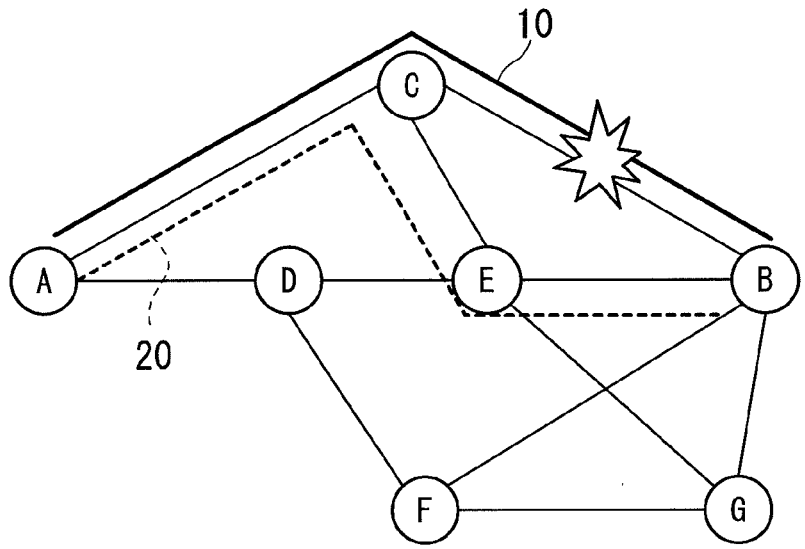
FIG. 8 is a block diagram showing an example of detouring a single failure according to the first embodiment of the present invention.
FIG. 9 is a table representing states of detour paths when a single failure occurs according to the first embodiment of the present invention.

First, a switching example in the case of a failure will be described with reference to FIGS. 8 and 9. FIG. 8 shows a detour path 20, which is a detour route of a working path 10, selected when the single failure occurs.

Specifically, the failure occurs between the communication device B and the communication device C in FIG. 8. Accordingly, the working path 10 via the communication device A, the communication device C, and the communication device B is switched to the detour path 20 via the communication device A, the communication device C, the communication device E, and the communication device B.

FIG. 9 shows path information T400 in the working path DB 131 and the detour path DB 132 when the failure occurs. In FIG. 9, the information with a priority of 0 is stored in the working path DB 131. Information with priorities of 1 to 4 is stored in the detour path DB 132.

For the path information T400, paths are calculated before a failure occurs and set as a currently-used path and a detour path by the above-described signaling procedure.

Here, the value of a cost of the link is 10. An overlapping degree indicates a route overlapping degree with currently used working paths, and the value from which the cost of an overlapped link was subtracted is set as the path cost.

When the failure occurs in a communication link BC (a link between a communication device B and a communication device C) for which the working path 10 is set, the XC control monitoring unit 123 of the communication device B or the communication device C detects the failure and transmits a failure notification to a communication device A that is a starting point of the working path 10.

The communication device A that has received the failure notification analyzes a failure location included in the failure notification, and updates the states of path information in the working path DB 131 and the detour path DB 132. A detour path with the lowest priority 1 (route AC to CE to EB) is selected from detour paths with a state "Up" in the updated path information of the detour path DB 132, and the detour path 20 is set by signaling along the route.

By doing so, it is possible to rapidly set the detour path and detour the path with the single failure.

Next, a switching example in the case of multiple failures will be described with reference to FIGS. 10 and 11.

Figures 10, 11:
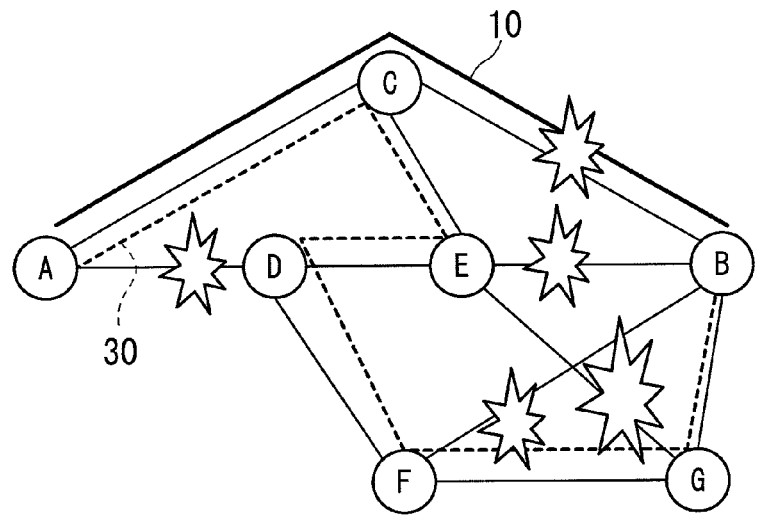
FIG. 10 is a block diagram showing an example of detouring multiple failures according to the first embodiment of the present invention.
FIG. 11 is a table representing states of detour paths when multiple failures occur according to the first embodiment of the present invention.

FIG. 10 shows a detour path 30, which is a detour route for a working path 10, selected when two failures occur.

Specifically, in FIG. 10, failures occur between a communication device A and a communication device D, between a communication device B and a communication device C, between the communication device B and a communication device E, between the communication device B and a communication device F, and between the communication device E and a communication device G.

Accordingly, the working path 10 via the communication device A, the communication device C, and the communication device B is switched to the detour path 30 via the communication device A, the communication device C, the communication device E, the communication device D, the communication device F, the communication device G, and the communication device B.

FIG. 11 shows path information T420 in the working path DB 131 and the detour path DB 132 when the failure occurs. In FIG. 11, information with the priority of 0 is stored in the working path DB 131. Information with priorities of 1 to 4 is stored in the detour path DB 132.

For the path information T420, routes are calculated before the failure occurs and set as a currently-used path and a detour path by the above-described signaling procedure.

Here, the value of a cost of the link is 10. An overlapping degree indicates a route overlap degree with currently used working paths. In addition, the value from which the cost of an overlapped link was subtracted is set as the path cost.

When failure occurs in a communication link BC (a link between the communication device B and the communication device C) for which the working path 10 is set, the XC control monitoring unit 123 of the communication device B or the communication device C detects the failure and transmits a failure notification to the communication device A, which is a starting point of the working path 10.

Simultaneously, when failures occur in the communication link BE (the link between the communication device B and the communication device E) of which the detour path is set, the communication link BF (the link between the communication device B and the communication device F), the communication link EG (the link between the communication device E and the communication device G), and the communication link AD (the link between the communication device A and the communication device D), the XC control monitoring unit 123 of the communication device adjacent to each link detects the failures and transmits a failure notification to the communication device A, which is the starting point of the working path 10.

The communication device A that has received the failure notification analyzes failure locations included in the failure notification, and updates states of the path information in the working path DB 131 and the detour path DB 132. A detour path with the lowest priority 4 (route AC to CE to ED to DF to FG to GB) is selected from detour paths with a state "Up" in the updated path information of the detour path DB 132, and the detour path 30 is set by signaling along the route.

Even when three or more failures simultaneously occur as described above, it is possible to rapidly set the detour path and detour the failed path.

Next, an example of a switching process when multiple failures occur in a network having a plurality of set paths will be described with reference to FIGS. 12, 13A, and 13B.

Figure 12:
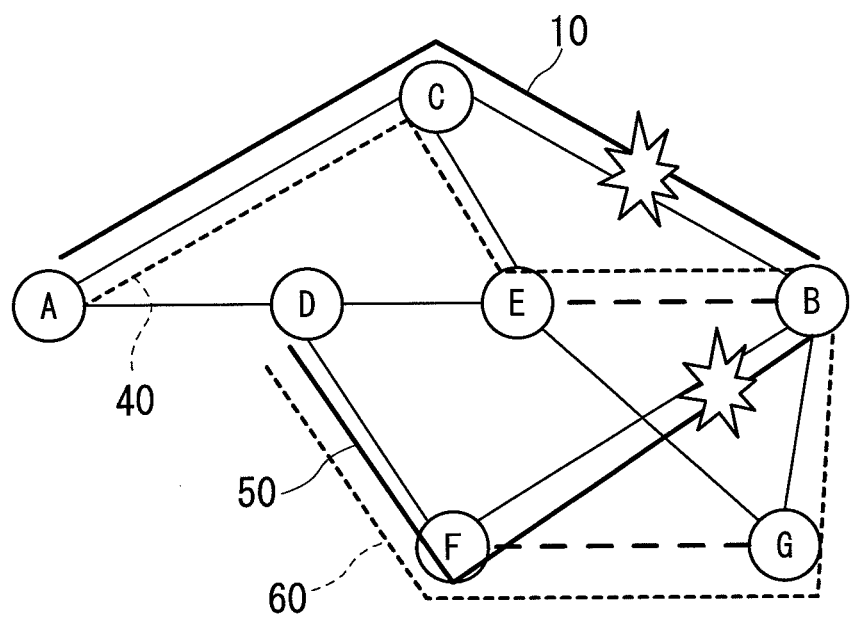
FIG. 12 is a block diagram showing an example of detouring multiple failures by adjusting multiple paths according to the first embodiment of the present invention.
Figure 14:
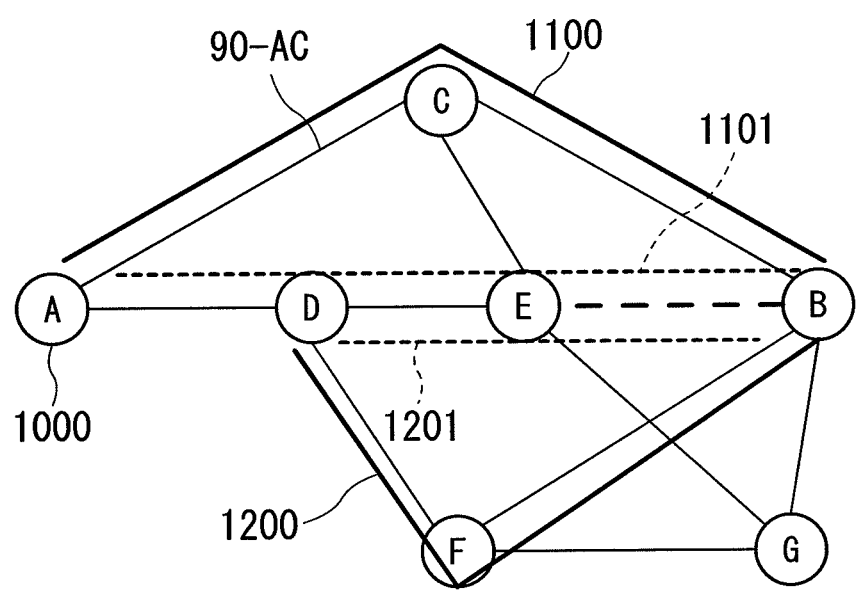
FIG. 14 is a block diagram showing network resource contention in conventional path re-routing.

FIG. 12 shows a detour path 40 for a working path 10 and a detour path 60 for a working path 50, which are selected when two failures occur.

Specifically, in FIG. 12, failures occur between a communication device B and a communication device C and between the communication device B and a communication device F.

Accordingly, the working path 10 via the communication device A, the communication device C, and the communication device B is switched to the detour path 40 via the communication device A, the communication device C, the communication device E, and the communication device B.

The working path 50 via the communication device B, the communication device F, and the communication device D is also switched to the detour path 60 via the communication device B, the communication device G, the communication device F, and the communication device D.

In FIG. 12, contention links are present between the communication device B and the communication device E and between the communication device F and the communication device G.

FIG. 13A shows path information T430 in the working path DB 131 and the detour path DB 132 when the failure occurs in the communication device A. In FIG. 13A, information with the priority of 0 is stored in the working path DB 131. Information with the priorities of 1 to 4 is stored in the detour path DB 132.

FIG. 13B shows path information T440 in the working path DB 131 and the detour path DB 132 when the failure occurs in the communication device D. In FIG. 13B, information with the priority of 0 and the state of "Down" is stored in the working path DB 131. Information with the priority of 0 and the state of "Up" and information with the priorities of 1 to 4 are stored in the detour path DB 132.

For the path information T430 and T440, routes are calculated before a failure occurs and adjustment link information is added to prevent interference. These paths are set as working and detour paths by the above-described signaling procedure.

Here, the value of a cost of the link is 10. An adjustment link is information set to prevent interference with a detour route for another working path. An overlapping degree indicates a route overlapping degree with the currently used working path. In addition, the value from which the cost of the overlapped links was subtracted is set as the path cost.

When failures occur in the communication link BC (the link between the communication device B and the communication device C) for which the working path 10 is set and the communication link FB (the link between the communication device F and the communication device B) for which the working path 50 is set, the XC control monitoring unit 123 of the communication device adjacent to each of the links detects the failures and transmits a failure notification to the communication device A that is a starting point of the working path 10 and to the communication device D that is a starting point of the working path 50.

Simultaneously, since the detour path is set for the failed communication links, both the communication device A and the communication device D can receive a failure notification for routes other than the route of the working path.

The communication device A that has received the failure notification analyzes failure locations included in the failure notification, and updates the states of the path information in the working path DB 131 and the detour path DB 132. In this case, the communication device A updates the adjustment link information, as well as the route information.

The detour path with the lowest priority of 1 (route AC to CE to EB) is selected from routes which have the states of "Up" in the updated path information in the detour path DB 132 and for which the failures do not occur on the adjusted links, and the detour path 40 is set by signaling along the route.

Similarly, the communication device D that has received the failure notification analyzes failure locations included in the failure notification, and updates the states of the path information in the working path DB 131 and the detour path DB 132. In this case, the communication device D updates the adjustment link information, as well as the route information.

The detour path with the lowest priority of 1 (route EF to FG to GB) is selected from routes which have the states of "Up" in the updated path information in the detour path DB 132 and for which the failures do not occur on the adjusted links, and the detour path 60 is set by signaling along the route.

Thus, even when two or more failures occur simultaneously, it is possible to rapidly set the detour path and detour the failed path without contention with other paths.

In the present embodiment, a plurality of detour paths without a reserved band are set in advance in preparation for various failures, as described above. Accordingly, even when multiple failures occur, it is possible to quickly detect failure locations regarding the detour path and rapidly set detour paths.

Further, it becomes possible to set the detour paths with minimal network resources by determining the cost of the detour path in consideration of the overlapping degree with the currently used working path.

In the present embodiment, the configuration and operation of the start-point communication device on the currently-used path that initiates the setting of the detour path have been described; however, the present invention is not limited thereto. For example, the present invention may also be applied to a segment detouring method that allows an intermediate communication device on the currently-used path to initiate the setting.

The embodiments of the present invention have been described with reference to the drawings; however, the detailed configuration thereof is not limited to the embodiments, and designs or the like without departing from the subject matter of the present invention are also included in the claims.

INDUSTRIAL APPLICABILITY

According to the present invention, in the communication network system within a communication carrier or company consisting of a plurality of nodes, the present invention may be applied as a failure recovery function to recover from multiple failures. In addition, the failure recovery function of the present invention may not only be applied to a geographically wide network but may also be used for communication between chips within a computer.

The invention claimed is:

1. A communication network system comprising a plurality of communication devices, transmission links, and a route design device, each of the plurality of communication devices comprising a switching unit which switches traffic routes, the transmission links connecting the plurality of communication devices, and the route design device calculating routes of a plurality of detour paths such that the plurality of detour paths do not contend with each other when a failure occurs in calculation of the plurality of detour paths corresponding to different currently-used paths, wherein a start-point communication device of the plurality of communication devices comprising:

a storage unit which previously stores information of a plurality of detour paths corresponding to but having routes different from a working path that is transferring traffic between the start-point communication device and an endpoint communication device; and a setting unit which receives a failure notification when a failure occurs in the working path, selects a detour path having the highest priority from among the plurality of detour paths stored in storage unit, the plurality of detour paths being switchable and for which a failure does not occur on adjusted links, and then reserves band for relevant communication devices among the plurality of communication devices along the selected route of the detour path, and performs cross-connection to recover from the failure, wherein the route design device comprises a detour path adjusting unit which assigns one of the plurality of detour paths a right to priority use for preferentially using the transmission links when a contention due to insufficient bands occurs in the transmission links between the plurality of detour paths corresponding to the different currently-used paths, and transmits, to the start-point communication device, information as an adjusted link, the information indicating each of the transmission links of the currently-used paths corresponding to a detour path acquiring the right to priority use, the information being associated with a detour path not acquiring the right to priority use, and the start-point communication device storing the information of the plurality of detour paths not acquiring the right to priority use.

2. The communication network system according to claim 1, wherein the plurality of detour paths stored in the storage unit of the start-point communication device are registered as paths for which reserving of bands and setting of the switching units are not performed in the communication devices along the route of the detour path, and when a failure affecting the detour path occurs, the communication device that has detected the failure or the communication device that has received the failure notification notifies the start-point communication device of a failure location.

3. The communication network system according to claim 1, wherein a requested band of the path is 0 in signaling for setting the detour path.

4. The communication network system according to claim 1, wherein the storage unit of the start-point communication device comprises a working path database which stores the working paths and a detour path database which stores information of the detour paths, and the setting unit of the start-point communication device:
stores information of the currently-used path that has been used as the working path in the detour path database as a detour path during the failure, stores information of the detour path used as the working path in the working path database, and refers to the information of the detour path to perform signaling for setting the detour path as a working path when switching to the detour path, and also stores the information of the currently-used path from the detour path database in the working path database after recovery from the failure, and refers to the information of the relevant currently-used path to revert to the currently-used path.

5. A communication device in a communication network system comprising a plurality of communication devices, transmission links, and a route design device, each of the plurality of communication devices comprising a plurality of transmission interfaces which convert main signals so as to have a predetermined transfer format for transmission and reception, a multiplexing/demultiplexing unit which multiplexes the main signals transmitted from the relevant transmission interfaces or demultiplexes received signals, and a switching unit which switches routes for the main signals; the transmission links connecting the plurality of communication devices, the route design device calculating routes of a plurality of detour paths such that the plurality of detour paths do not contend with each other when a failure occurs in calculation of the plurality of detour paths corresponding to different currently-used paths, and the communication device comprising:

a path management unit which manages the routes of the plurality of detour paths, the routes being different from a working path transferring traffic between a start-point communication device and an endpoint communication device;

a detour path selecting unit which selects a detour path having the highest priority from among a plurality of detour path candidates managed by the path management unit when a failure occurs in the working path that is transferring traffic, the plurality of detour path candidates being switchable and for which a failure does not occur on adjusted links; and a signaling unit which sets the working path managed by the path management unit to a detour path, reserves band for the communication devices, and performs cross-connection along a route of the detour path selected by the detour path selecting unit, wherein the adjusted links are the transmission links of the currently-used paths corresponding to a detour path to which a right to priority use for preferentially using the transmission links is assigned by the route design device when a contention due to insufficient bands occurs in the transmission links between the plurality of detour paths corresponding to the different currently-used paths, and wherein the start-point communication device stores information, received from the route design device, of a plurality of detour paths not acquiring a right to priority use.

6. The communication device according to claim 5, further comprising:

a path management unit which manages the routes of the working path and the detour path; and a failure notification party management unit which determines a party to be notified when a failure in the detour path or the working path is detected.

7. A route design device in a communication network system having a plurality of communication devices and transmission links, each of the plurality of communication devices comprising a switching unit which switches traffic routes, the transmission links connecting the plurality of communication devices, and the route design device comprising:

a route calculation unit which refers to topology information of the communication network to calculate a route from a start-point communication device to an endpoint communication device;

a right to priority use assigning unit which assigns one of a plurality of detour paths a right to priority use for preferentially using the transmission links when a contention due to insufficient bands occurs in the transmission links between the plurality of detour paths corresponding to different current-used paths, and a detour path adjusting unit transmits, to the start-point communication device, information as an adjusted link, the information indicating each of the transmission links of the currently-used paths corresponding to a detour path acquiring the right to priority use, the information being associated with a detour path not acquiring the right to priority use, and the start-point communication device storing the information of the plurality of detour paths not acquiring the right to priority use.

8. A failure recovery method in a communication network system comprising a plurality of communication devices, transmission links, and a route design device, each of the plurality of communication devices comprising a switching unit which switches traffic routes, the transmission links connecting the plurality of communication devices, and the route design device calculating routes of a plurality of detour paths such that the plurality of detour paths do not contend with each other when a failure occurs in calculation of the plurality of detour paths corresponding to different currently-used paths, wherein a start-point communication device of the plurality of communication devices:

sets a plurality of detour paths corresponding to but having routes different from a working path that is transferring traffic between the start-point communication device and an endpoint communication device, assigns one of a plurality of detour paths a right to priority use for preferentially using the transmission links when a contention due to insufficient bands occurs in the transmission links between the plurality of detour paths corresponding to different currently-used paths, transmits, to the start-point communication device, information as an adjusted link, the information indicating each of the transmission links of the currently-used paths corresponding to a detour path acquiring the right to priority use, the information indicating each of the transmission links of the currently-used paths corresponding to a detour path acquiring the right to priority use, the information being associated with a detour path not acquiring the right to priority use, and the start-point communication device storing the information of the plurality of detour paths not acquiring the right to priority use, selects a detour path having the highest priority from among the plurality of detour paths, the plurality of detour paths being switchable and for which a failure does not occur on adjusted links, and then reserves band for relevant communication devices among the plurality of communication devices along the selected route of the detour path, and performs cross-connection to recover from the failure.

9. The method according to claim 8, wherein, when switching to the detour path, the start-point communication device stores information of a currently-used path that has been used as the working path as a detour path during the failure, and reverts to the currently-used path after recovery from the failure.

* * * * *